US007904887B2

(12) United States Patent
Franaszek et al.

(10) Patent No.: US 7,904,887 B2
(45) Date of Patent: *Mar. 8, 2011

(54) LEARNING AND CACHE MANAGEMENT IN SOFTWARE DEFINED CONTEXTS

(75) Inventors: Peter A. Franaszek, Mount Kisco, NY (US); Luis Alfonso Lastras Montaño, Cortland Manor, NY (US); R. Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

This patent is subject to a terminal disclaimer.

(21) Appl. No.: 11/355,357

(22) Filed: Feb. 16, 2006

(65) Prior Publication Data
US 2007/0234323 A1    Oct. 4, 2007

(51) Int. Cl.
G06F 9/44    (2006.01)

(52) U.S. Cl. ........ 717/127; 717/131; 717/151; 711/113; 711/118; 711/125

(58) Field of Classification Search ................... 717/127, 717/131, 151
See application file for complete search history.

(56) References Cited

U.S. PATENT DOCUMENTS

| | | | | |
|---|---|---|---|---|
| 5,265,254 | A * | 11/1993 | Blasciak et al. | 717/130 |
| 5,544,342 | A * | 8/1996 | Dean | 711/119 |
| 5,553,276 | A * | 9/1996 | Dean | 713/500 |
| 5,590,356 | A * | 12/1996 | Gilbert | 712/31 |
| 5,613,136 | A * | 3/1997 | Casavant et al. | 712/28 |
| 5,752,068 | A * | 5/1998 | Gilbert | 712/16 |
| 5,754,839 | A * | 5/1998 | Pardo et al. | 712/227 |
| 6,029,002 | A * | 2/2000 | Afifi et al. | 717/131 |
| 6,262,730 | B1 * | 7/2001 | Horvitz et al. | 715/707 |
| 6,269,438 | B1 * | 7/2001 | Chang | 712/233 |
| 6,378,064 | B1 * | 4/2002 | Edwards et al. | 712/227 |
| 6,499,116 | B1 * | 12/2002 | Roth et al. | 714/39 |
| 6,536,037 | B1 * | 3/2003 | Barrese et al. | 717/151 |
| 6,766,514 | B1 * | 7/2004 | Moore | 717/159 |
| 7,043,716 | B2 * | 5/2006 | Zimmer et al. | 717/107 |
| 7,062,567 | B2 * | 6/2006 | Benitez et al. | 709/231 |
| 7,269,718 | B2 * | 9/2007 | Alexander et al. | 712/221 |
| 7,526,757 | B2 * | 4/2009 | Levine et al. | 717/130 |
| 7,555,566 | B2 * | 6/2009 | Blumrich et al. | 709/249 |
| 2002/0161908 | A1 * | 10/2002 | Benitez et al. | 709/231 |
| 2003/0051226 | A1 * | 3/2003 | Zimmer et al. | 717/102 |
| 2005/0071515 | A1 * | 3/2005 | DeWitt et al. | 710/1 |
| 2005/0071822 | A1 * | 3/2005 | DeWitt et al. | 717/131 |

(Continued)

OTHER PUBLICATIONS

Title: Selecting software phase markers with code structure analysis, author: Lau et al, source: IEEE, dated: Mar. 26, 2006.* Title: Value Profiling, author: Calder et al, source: IEEE, dated: Dec. 1, 1997.*

*Primary Examiner* — Chameli C Das
(74) *Attorney, Agent, or Firm* — F. Chau & Associates, LLC (57) ABSTRACT

A method of optimizing a computer program includes executing a program including a hint defined as a variable in program and providing within the program, and a marker instruction that receives the hint as a parameter. The marker instruction marks a section of the computer program for a subsequent optimization. During the execution of the computer program, and in response to the marker instruction being executed, a hardware engine monitors data accesses associated with execution of instructions in the marked section and stores the data accesses in the storage of the hint. A subsequent execution of the marked section of the computer program is optimized using the data stored in the storage of the hint.

8 Claims, 3 Drawing Sheets

U.S. PATENT DOCUMENTS

2005/0081019 A1* 4/2005 DeWitt et al. ............. 712/227
2005/0228511 A1* 10/2005 Das et al. ................ 700/28
2005/0251706 A1* 11/2005 Alexander et al. ........... 714/49
2006/0206874 A1* 9/2006 Klein ...................... 717/136
2008/0244533 A1* 10/2008 Berg et al. ................ 717/128

* cited by examiner

LEARNING AND CACHE MANAGEMENT IN SOFTWARE DEFINED CONTEXTS

GOVERNMENT RIGHTS STATEMENT

This invention was made with Government support under Contract No. NBCH3039004 awarded by Defense Advanced Research Projects Agency (DARPA). The Government has certain rights in this invention.

BACKGROUND OF THE INVENTION

1. Field of the Invention

The present invention relates generally to the field of computer system design and programming, and, more particularly, to learning and cache management in software defined contexts.

2. Description of the Related Art

Memory latency in modern computers is not decreasing at a rate commensurate with increasing processor speeds. This results in the computing device idly waiting for the system to fetch processes from the memory, thereby not fully taking advantage of the faster processor speeds. This problem is sometimes referred to as the memory wall problem.

However, the memory wall problem is not exclusive to memory accesses and may arise in a number of information retrieval scenarios, as contemplated by those skilled in the art. For example, when a line requested by a local processor has been modified by a remote processor, then such line needs to be communicated from the remote processor to the local processor. This communication process may necessitate a significant amount of time. Thus, we refer to the memory wall problem more generally as the "data access" wall problem.

An approach to mitigating data access latency is prefetching. The term "prefetching," as used herein, traditionally refers to retrieving data expected to be used in the future. This results in increased complexity, as well as increased off-chip traffic. Prefetching increases traffic by fetching data that is not referenced before castout. As used herein, the term "castout" refers to the process by which data is removed from the cache to make room for data that is fetched.

Prefetching may be implemented, for example, using only hardware. With such hardware-only prefetch mechanisms, the details of the prefetching mechanism are largely hidden from an application programmer. However, hardware-only prefetch mechanisms are limited because prefetching is usually forced to be based solely on historical access information (e.g., a directory extension) and/or limited predictions based on the detection of simple patterns such as address strides. The directory extension is described Franaszek et al., "Victim Prefetching in a Cache Hierarchy," Ser. No. 10/989,997, the disclosure of which is entirely incorporated herein.

A brief description of the techniques of stride detection and directory extension will now be provided. Software code frequently processes batches of data by scanning it upwards or downwards. The resulting data access patterns can be detected and subsequently predicted by simple circuitry which is often included in computing processors. This technique can be very successful in improving the performance of software codes with the property above, but cannot predict other patterns that may arise that do not have this simple regular structure. An example of a technique that is designed to deal with the latter is a directory extension, which is described next. A victim cache stores lines evicted from a primary cache, and is known to improve the performance of direct-mapped caches significantly. With a directory extension, the concept of the victim cache is further extended such that only the identities of the victims are stored, rather than the actual lines of the cache. The victims' information is stored page-wise in a cache called the "directory extension" because it identifies which lines are in, for example, level 3 (L3) of the cache but not in level 2 (L2) for a set of recently accessed pages. Misses in L2 immediately trigger prefetching from the L3 into the L2 in accordance with the information provided by the directory extension, if an entry for the given page exists.

Alternatively, prefetching may be implemented using software. Software-directed prefetching is based on the concept that the (data and/or instruction) access patterns observed by hardware-only prefetching mechanisms are produced by software. Thus, in principle, appropriate analysis at the compiler level (e.g., online in the setting of continuous optimization of code) or application programmer-provided hints may provide higher quality prefetch instructions than in the hardware-only case. However, a compiler may be successful only for a limited class of software codes. Further, it must be assumed that a programmer will have sufficient time and experience to provide good software hints, which is not always feasible.

SUMMARY OF THE INVENTION

In one aspect of the present invention, a system is provided. The system includes at least one processor; a main memory operatively connected to the at least one processor; at least one cache operatively connected to the main memory and the at least one processor; a program application to be executed by the at least one processor, the program software includes at least one marker; and a marker management engine operatively connected to the at least one processor, the main memory, and the at least one cache; wherein the marker management engine (a) monitors when each of the at least one marker is reached in the execution of the program software, (b) monitors data accesses by the at least one processor to the at least one cache and the main memory, (c) stores at least one of the monitored data accesses in a pre-defined location in the main memory, and (d) optimizes the program software executed by the at least one processor based on the stored data accesses.

In another aspect of the present invention, a method of optimizing a computer program is provided. The computer program is capable of being executed on a processor-based system. The method includes the steps of placing at least one marker in the computer program, wherein each of the at least one marker is associated with at least one instruction in the computer program; executing the computer program; and if the step of executing the computer program involves executing the at least one instruction and if executing the at least one instruction requires at least one external data access, optimizing the computer program to reduce processor stalls associated with the at least one external data access. The optimizing may include monitoring data access patterns in executing the at least one instruction, storing information related to the data access patterns from the step of monitoring, retrieving the information related to the data access patterns when the at least one marker is reached, and executing one of a cache state update operation or a prefetch instruction operation using the data access pattern information retrieved.

In yet another aspect of the present invention, a method of optimizing a computer program is provided. The computer program capable of being executed on a processor-based system. The method includes the steps of placing at least one marker in the computer program, wherein each of the at least one marker is associated with at least one preferred processor optimization engine state and at least one instruction; executing the computer program; and if the step of executing the computer program involves executing the at least one instruction, updating a processor optimization engine state to the preferred processor optimization state prior to the execution of the at least one instruction.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

INTRODUCTION

Exemplary embodiments of the present invention described herein address the problem of the data access wall resulting from processor stalls due to the increasing discrepancies between processor speed and the latency of access to data that is not stored in the immediate vicinity of the processor requesting the data. The exemplary embodiments of the present invention combine the benefits of hardware and software prefetching fields.

A computing system is comprised of physical assets, which we term "hardware," and is additionally comprised of software, which is executed by the underlying hardware. The hardware provides generic basic services such as processing, volatile and non-volatile storage, network communication, and the like. The hardware can be customized to perform specific tasks via the software. For the purposes of this invention, hardware is the product of a physical manufacturing process. On the other hand, software includes instructions, data and metadata that may be stored in various media including magnetic storage (e.g., hard disks), optical storage (e.g., compact discs, digital versatile discs), and other types of non-volatile and volatile memory. Software may include device drivers, the hypervisor, the operating system, middleware, applications, and the like. We refer to the aggregate of the hardware and software in which a computing processor is present as a processor-based system.

In an exemplary embodiment of the present invention, we rely on the software to provide intelligence with respect to which aspects of the operation of a computer program necessitate further improvement. We then utilize monitoring services in the hardware to identify particular means of achieving the required optimization. These means include, but are not limited to, prefetch and cache replacement decisions. The software intelligence may be based on off-line considerations at the time of the application writing or compiling, or based on on-line optimization techniques with the aid of performance information extracted from various performance monitors.

The exemplary embodiment described above is based on the observation that although a software programmer or compiler can often identify portions of a computer program with a noticeably poor performance due to memory wall effects, it is nevertheless frequently impractical to engage in a detailed analysis of the associated access patterns so as to craft improved program optimization policies. Exacerbating this problem, these access patterns are often determined only at the program run-time and can differ significantly across different computing systems or even across the same system operating under different conditions. The underlying processing hardware, on the other hand, has a unique vantage point in that it can track and learn about access patterns at the very source of their generation. However, hardware will generally have limited resources and thus, will only be able to store limited learned information. In addition, the hardware does not possess the kind of global program behavior information available at the software layer.

A system benefited with the present invention results in, among other things, a significantly improved productivity/performance balance because, for example, a greater emphasis can be placed in the functional, rather than the performance aspects of the software design.

In an exemplary embodiment of the present invention, the software programmer or the compiler interacts with the hardware so as to trigger the appropriate learning procedure by means of suitable programming language semantics during a first execution of the software code. This learned information may then be stored in placeholders in memory defined by these semantics. For subsequent executions of the software code the learned information is used to execute suitable cache management policies including, but not limited to, prefetching; we refer too these cache management actions as "cache state updates". Our learned information may be stored in program variables declared by the application programmer; these declarations may be achieved through special program declarations which employ labels distinct from those used for standard program variables. For example, standard declarations for the C programming language include "char" and "int." In the forthcoming examples, the label employed in the declaration will be referred to as a "hint," and we will generally refer to the learned information as "hints."

Naturally, a section of a code in a program or application (e.g., a "function" in the parlance of computer science terminology) can behave in a number of ways, depending on the global state of the computing system executing the program. Consequently, assigning access patterns statically to a section of the code appears to be unsatisfactory, even if the access patterns are made to be relative to a given offset. Thus a more flexible mechanism is required to associate hints with events at which these hints could become useful. To address the above, we introduce the idea of relating a "hint" to a "context." A hint is learned, whereas a context is specified by a programmer or a compiler. We provide, in greater detail below, a number of ways for a programmer or a compiler to relate a context to a hint.

The present invention also provides a general framework upon which buffer management policies can be implemented. Such policies include learned hints and fully-specified software hints. The present invention further provides a means for the hardware and the software to track the success rate of the policies as they are executed. Such information about the success rate of the policies can be used to adjust the implementation of the policies.

A First Exemplary Embodiment

We introduce a new software variable that we shall call a hint; equivalently, we shall say that the type of those variables is a hint. A hint behaves like any other variable, and is stored and manipulated with other variables, depending on where the hint is declared within the program. Nevertheless, a variable of hint type has the distinction that the hardware is the main entity responsible for the management of the hint's contents, unlike regular variables where the software has such responsibilities. The hardware will store within the space provided by the hints information gathered in a first execution of the code that it believes will be useful to improve performance in a future execution of the code associated with the same context.

We present an example in which an object-oriented language, such as C++ or Java, has been augmented with hints. In the following description, we shall use terminology that is common in the computer science literature: for example, a function consists of a well-defined procedure with input and output parameters; an object is a collection of functions, variables and its relations with other objects; and an instance of an object is a specific realization at program run-time of the abstract object notion.

Suppose that one is interested in optimizing the performance of a function "foo" in every instance of an object "apple." Like any other variables, hints can be declared globally or locally to the object, among other possibilities. The appropriate level for the storage of the hint is local to the object:

```
class apple {
    hint h;           // this is the hint declaration
    apple( );         // this is the object's constructor (standard
                      //   in the languages)
    ~apple( );        // this is the object's destructor (also standard)
    void foo( );      // this is the function to be optimized
}
```

It becomes obvious in the above example that there will be one hint per instance of the object. To instruct the hardware to learn and store in "h," and to prefetch according to what was learned, we write the following.

```
class apple {
    prefetch(h);      // tells the hardware to prefetch according to hint h
    learn(h);         // learn new access patterns and store in h
    <CODE TO BE OPTIMIZED>
}
```

In the above, the prefetches are executed through the prefetch(h) instruction and the store function is executed through the learn(h) instruction. We refer to the prefetch and learn instruction as markers, since at a high level they are used to mark sections of the code for subsequent optimization; we say that the markers are associated with the instructions that comprise the code to be optimized. It is important to note that the markers themselves are instructions. However, for the purpose of clearly distinguishing standard instructions from markers, we shall say that the marker is reached when a marker is executed. The actual software code location of prefetch and learn instructions together with the location of the declaration of the hint constitute the context of the hint.

In an alternate, exemplary embodiment, we shall discuss alternate ways of specifying a context. The present invention is general enough to allow for a number of actions whenever the prefetched data eventually arrives, including its storage in one or more caches. Moreover, prefetching is not the only possible action resulting from the information previously learned; other actions include updates to the states of the caches in the system such as promoting or demoting the least recently used (LRU) status of a line within its cache equivalence class, and preventing or causing the eviction of a line from a cache.

Of significant importance here is determining what the hardware monitors and stores when the learn instruction is executed. For example, every data reference caused by the microprocessor may be stored in "h" until the storage provided by "h" is filled. However, this may be inefficient because the microprocessor causes data references at extremely high rates whereas only a small fraction of these result in memory references, with the vast majority resulting in cache hits of various sorts.

A solution is to place a filter to monitor accesses at higher levels of the hierarchy such as the L1/L2 layer or other suitable locations and to add mechanisms for identifying good prefetches such as the notion of feedback in the directory extension technology.

The above constitutes a general explanation of the functioning and use of one exemplary embodiment of this invention. Alternate embodiments may incorporate changes to microprocessor chips such as one or more processor cores which may include one or more threads. The learn and prefetch instructions, as well are other instructions can be part of the instruction set of the core (which can be costly to implement), or may be implemented using memory-mapped registers. An implementation of the latter requires very little changes to current microprocessor designs; here, the new prefetch and learn instructions are eventually translated by the compiler to standard load/store instructions with address targets that lie in a special purpose address range outside that occupied by memory. Simple circuitry inside of the microprocessor associated with this special purpose address range then reacts to the load or store to implement the learning or prefetching policies described above. This may be accomplished by employing logic circuits and internal storage, which interact with caches, memory controllers, and the memory subsystem.

As previously discussed, whenever the learn instruction is encountered, the hardware stores relevant information in the space associated with the hint. An important question is when this learning will stop. We have previously mentioned that such learning could stop whenever there is no more space because the hint is filled with information; other possibilities include adaptively deciding what to keep and discard as new information arrives, and hence, in this scenario, the learning never stops. Another possibility is to provide another software instruction which we shall call "stop_learn" that halts all further learning and writing to a hint whose identity is passed as a parameter.

This invention further provides a means to coordinate the management of the process of learning and prefetching for several hints simultaneously, which is of importance in processor chips that have many processor cores and/or have cores that have many threads.

Second Exemplary Embodiment

The first exemplary embodiment, described in greater detail above, has the property that hints are treated as standard variables, and thus, very few changes are required in a system to implement them. Nevertheless, the embodiment possesses useful properties. For example, the hints are stored in main memory as regular variables, and thus, very few changes are required in a system to implement them. In the first exemplary embodiment, a context is defined by the location within the software code of the hint declaration.

We introduce a second exemplary embodiment in which a context is defined by aggregating the values of a set of programmer-defined values. In this second exemplary embodiment, hints are not declared explicitly. Rather, hints are created/updated only when the appropriate context is formed. In the following example, assume that "foo" has one parameter p, which changes the access pattern expected from "foo":

```
void object::foo( int p ) {
    learn_in_context( this , p , &foo );      // context given by
                                              parameters
    prefetch_in_context( this , p , &foo );   // context given by
                                              parameters
    <CODE TO BE OPTIMIZED>
}
```

The learn_in_context and prefetch_in_context instructions accept any number of parameters; for example the parameters in the above case are "this", "p" and "&foo". These parameters are taken by a microprocessor that produces a single N-bit identity (i.e., a hint ID) for that particular learn/fetch instruction instance. The precise way in which the parameters are combined to form the hint ID is not of much importance as long as the hint ID has the properties of good hash functions such as having low probability of mapping two different contexts to the same N-bit identity.

One possibility is to assign an N-bit hash value to every parameter and then to XOR the results; these hash values themselves can be produced by applying various XOR operations to the digital representations of the parameters. Although it is entirely possible for a different set of parameters to map the same hint ID, the likelihood of such an occurrence can be substantially reduced by keeping, for example, N sufficiently large. Optimal values for N can be determined via experimentation.

Once a hint ID has been calculated, the hardware is informed, as before, that it should learn some aspect of the sequence of accesses that are about to be produced. The learned data are then associated with the hint ID and stored in the hint. Hints in turn are stored in a set associative buffer, which we call a "hint buffer," for efficient storage and retrieval. Another hash value for the hint ID may be used to determine the set in which the hint is stored.

Execution of the prefetch_in_context instruction also triggers a search in the hint buffer for each given hint ID. In case of success, prefetches are issued in accordance to the information stored in the hint, either directly or indirectly through the directory extension or some other means.

If two separate pieces of code need to be optimized with the same function, one may write the following:

```
void object::foo( int p ) {
    prefetch_in_context( this , p , &foo, 1 );
    learn_in_context( this , p , &foo, 1);
    <CODE BE OPTIMIZED 1>
    prefetch_in_context( this , p , &foo, 2 );
    learn_in_context( this , p , &foo, 2);
    <CODE BE OPTIMIZED 2>
}
```

Exemplary System and Method

Figure 1:
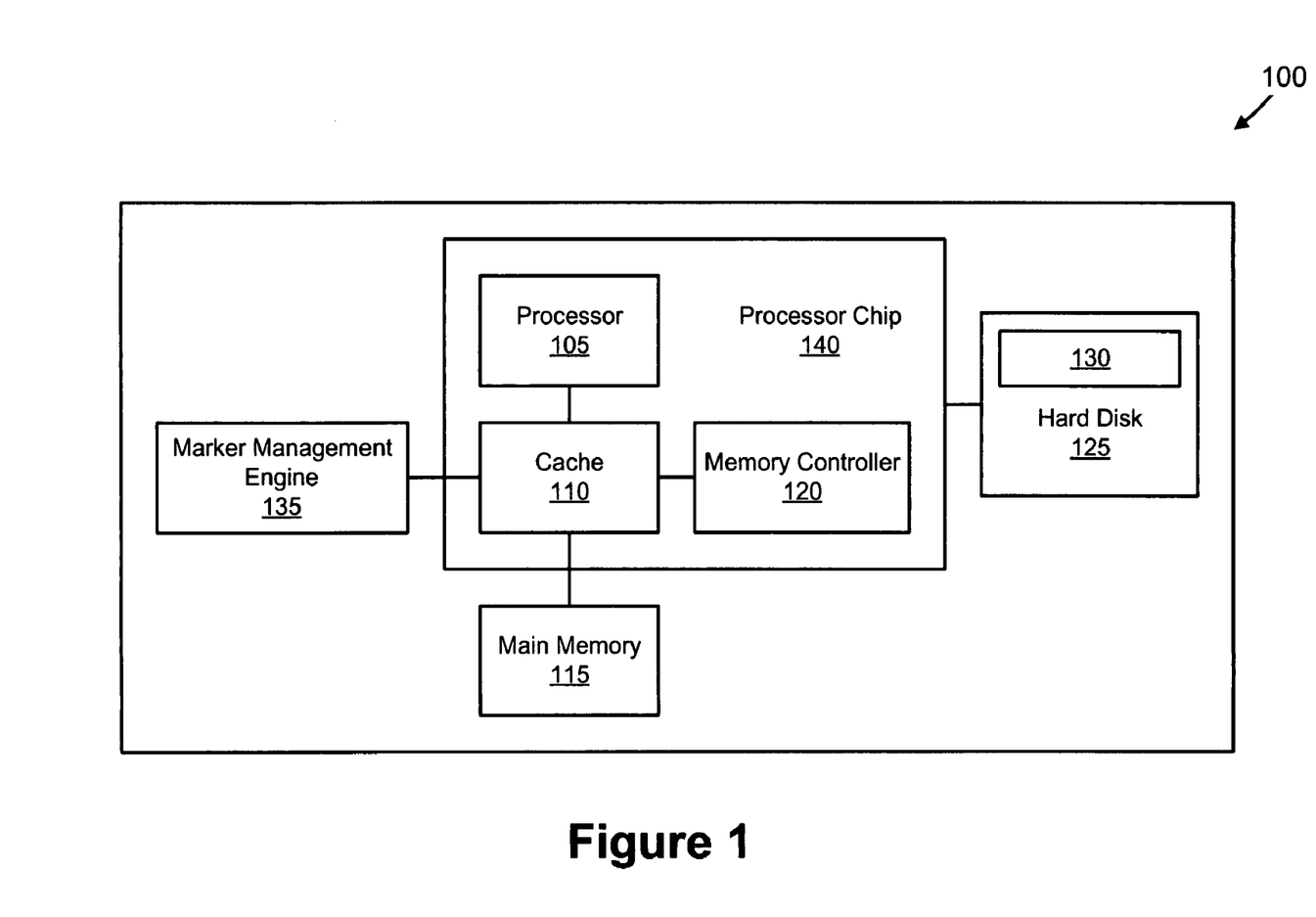
FIG. 1 depicts a processor-based system, in accordance with an exemplary embodiment of the present invention.

Referring to FIG. 1, a processor-based system 100 is provided, in accordance with an exemplary embodiment of the present invention. The system 100 includes a processor 105, a cache 110, a main memory 115, a memory controller 120, and a hard disk 125. The memory controller 120 manages the flow of data to and from the main memory 115 and the cache 110. The processor 105, a cache 110, and the memory controller 120 are part of a processor chip 140. It should be appreciated that although an on-chip cache is shown, off-chip cache (not shown) may also be included in the system 100, as contemplated by those skilled in the art.

The hard disk 125 includes a computer program 130. Alternatively, the computer program 130 may be present on an external storage unit (not shown), such as a floppy disk or flash drive. The computer program 130 may include one or more markers (not shown). The markers may be manually inserted by a user or automatically through another application.

The system 100 further includes a marker management engine 135. The marker management engine 135 performs a number of functions. The marker management engine (a) monitors when each marker is reached in the execution of the computer program 130, (b) monitors data accesses by the processor 105 to the cache 110 and the main memory 115, (c) stores the monitored data accesses in a pre-defined location in the main memory 115, and (d) optimizes the computer program 130 executed by the processor 105 based on the stored data accesses.

It should be noted that the system 100 is only exemplary and is not so limited, as contemplated by those skilled in art. For example, an alternate system may include multiple processors, multiple caches, and multiple levels for each cache. For another example, the marker management engine 135 may be a part of the memory controller 120.

Figure 2:
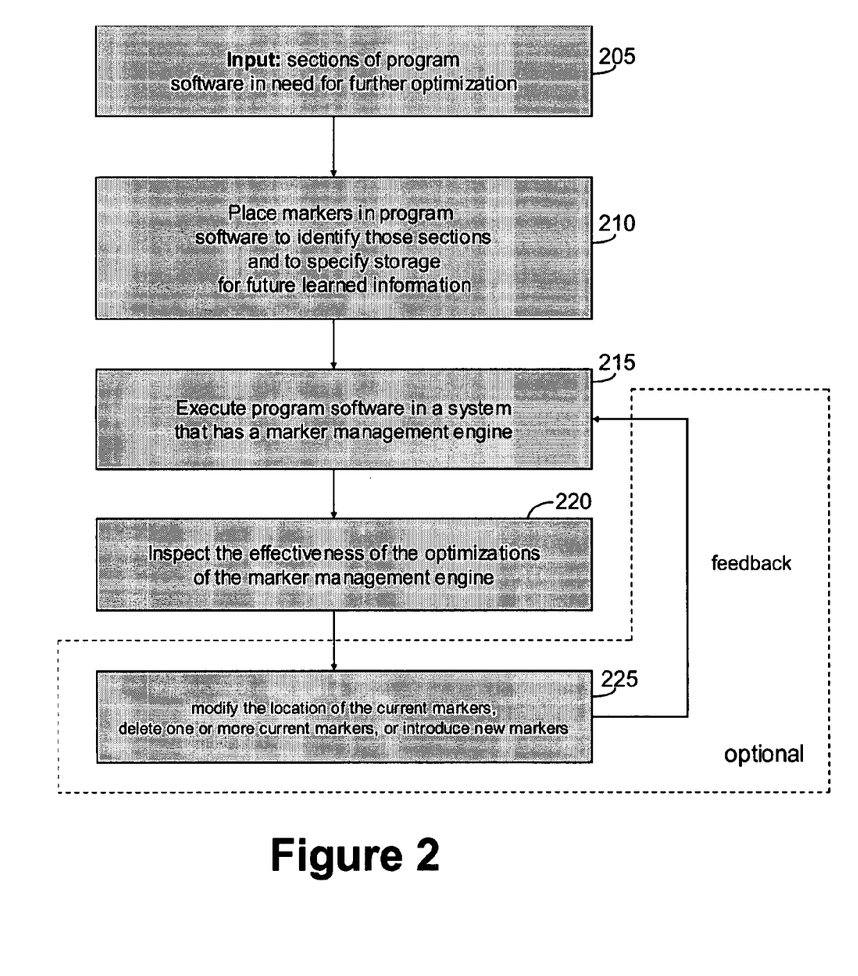
FIG. 2 depicts a method of optimizing a computer program, in accordance with an exemplary embodiment of the present invention.

Referring to FIG. 2, a method of optimizing a computer program is shown, in accordance with an exemplary embodiment of the present invention. Sections of program software in need of further optimization are inputted (at 205). For example, a user may input the sections. Alternatively, the sections may be determined automatically, as contemplated by those skilled in the art. Markers are placed (at 210) into the program software to identify the inputted sections and to specify storage for future learned information. The program software is executed (at 215) in a processor-based system with a marker management engine, which performs a number of optimizations. The effectiveness of the optimizations of the marker management engine are inspected (at 220). If the inspection (at 220) indicates that the optimizations are not effective, any one of three things may happen (at 225): (1) current markers may be modified; (2) one or more of the current markers may be deleted, or (3) new markers may be added. The program software is then re-executed (at 215) based on feedback provided through step 225.

It should be appreciated that step 225 is optional. For example, step 225 may not occur because the current optimizations are determined to be effective.

Figure 3:
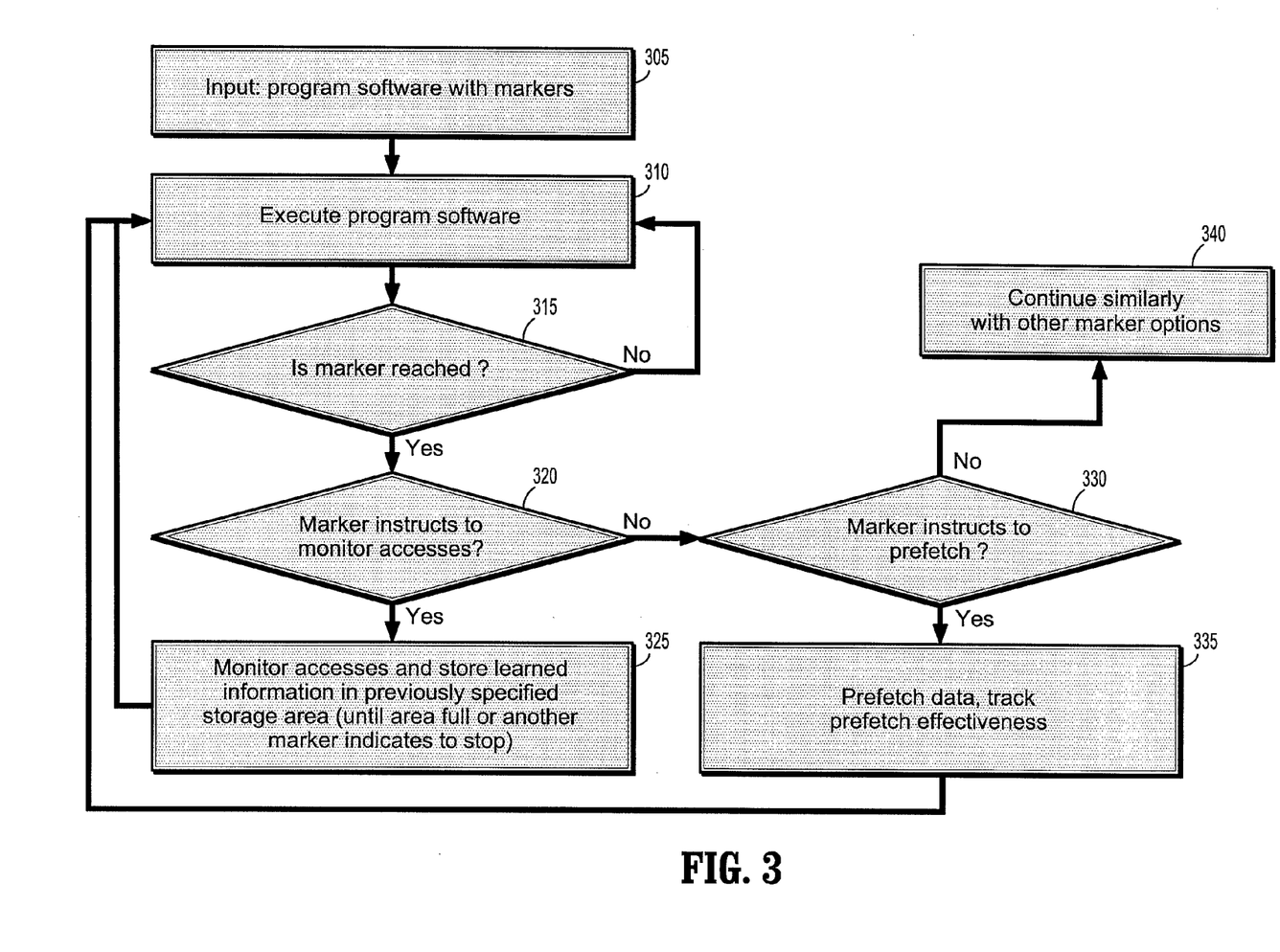
FIG. 3 depicts another method of optimizing a computer program, in accordance with an exemplary embodiment of the present invention.

Referring to FIG. 3, an alternate method of optimizing a computer program is shown, in accordance with an exemplary embodiment of the present invention. A program software with markers already inserted is inputted (at 305). The program software is executed (at 310). It is determined (at 315) whether a marker has been reached. If it is determined (at 315) that a marker has been reached, then it is determined (at 320) whether the marker instructs the system to monitor accesses. If it is determined (at 320) that the marker instructs the system to monitor accesses, then accesses are monitored (at 325) and learned information is stored (at 325) in a previously specified storage area, for example, until the area is full or another marker indicates to stop. The step of monitoring and storing the learned information is done in background by the marker management engine; that the program software continues execution is denoted by the arrow going back to (at 310).

If it is determined (at 320) that the marker does not instruct the system to monitor accesses, then it is determined (at 330) whether the marker instructs the system to prefetch. If it is determined (at 330) that the marker instructs the system to prefetch, then data is prefetched (at 335) and the effectiveness of the data is tracked (at 335). The program software continues execution (at 310); there is no need for the prefetches to finish. The program or application programmer may examine the effectiveness of the prefetches to modify the markers in the software. If it is determined (at 330) that the marker does not instruct the system to prefetch, then we continue (at 340) with other marker options, as contemplated by those skilled in the art.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of optimizing a computer program, the computer program executable on a processor-based system, the method comprising the steps of:

executing the computer program, the computer program comprising a hint providing storage within the program, wherein the hint is defined as a software variable in the computer program, where the hint has a label that indicates that the hint is used to store learned information, and a hardware engine of the system is primarily responsible for managing contents of the hint, and the computer program includes a marker instruction represented as a software function that is passed the hint as a software parameter, wherein a software code location of the software function within the computer program marks a section of the computer program for a subsequent optimization;

during the execution of the computer program, and in response to the marker instruction being executed by the computer program, the hardware engine of the system performing:

monitoring of data references caused by execution of instructions in the marked section; and storing the data references in the storage of the hint; and optimizing a subsequent execution of the marked section of the computer program using the data stored in the storage of the hint.

2. The method of claim 1, wherein the monitoring of the data references continues until the storage is filled.

3. The method of claim 1, wherein the monitoring of the data references continues until the computer program executes a second marker instruction whose executions halts the monitoring.

4. The method of claim 1, further comprising during the execution of the program, and in response to a second marker instruction being executed by the program, the hardware engine further performing prefetching of data to a cache according to the hint.

5. The method of claim 1, wherein the optimizing is only performed if the execution of the marked section requires at least one external data access.

6. A method of optimizing a computer program, the computer program capable of being executed on a processor-based system, the method comprising the steps of:

automatically placing at least one marker instruction and a software variable in the computer program based on results of a profiler, wherein the software variable provides storage within the program and has a label that indicates the software variable is used to store learned information, wherein a hardware engine of the system is primarily responsible for managing contents of the software variable, wherein the at least one marker instruction are represented as software functions in the program being passed the software variable as a software parameter;

executing the computer program along with the at least one marker instruction, wherein a software code location of the corresponding software functions within the program mark respective sections of the program, wherein the executing of the at least one marker instruction performs:

monitoring of data references caused by execution of instructions in the marked sections; and storing the data references in the software variable; and optimizing the computer program based on the stored data references.

7. The method of claim 6, further comprising updating the software variable through a standard write instruction.

8. The method of claim 6, wherein the placing of the software variable comprises one of: declaring a special program variable distinct from standard program variable declarations, or declaring the variable to be global, local to a function, or local to an object.

* * * * *